Patented Mar. 9, 1926.

1,575,884

UNITED STATES PATENT OFFICE.

CARL STUART WILLIAMS, OF WOODBRIDGE, NEW JERSEY, ASSIGNOR TO THE ROESSLER AND HASSLACHER CHEMICAL COMPANY, OF NEW YORK, N. Y., A CORPORATION OF NEW YORK.

ACCELERATOR FOR THE VULCANIZATION OF RUBBER.

No Drawing. Original application filed February 6, 1925, Serial No. 7,237. Divided and this application filed June 17, 1925. Serial No. 37,876.

*To all whom it may concern:*

Be it known that I, CARL STUART WILLIAMS, a citizen of the United States, and resident of Woodbridge, in the county of Middlesex and State of New Jersey, have invented certain new and useful Improvements in Accelerators for the Vulcanization of Rubber, of which the following is a specification.

The object of this invention is to produce accelerators of the vulcanization of rubber which will when properly compounded produce finished rubber articles of superior physical properties such as high stress strain relationship, increased tensile strength, better aging qualities and freedom from sulphuring out or blooming. Further it is desired to provide high powered accelerators at lower costs than are now prevalent.

A good vulcanization accelerator is required to have a number of physical and chemical advantages, further it must be low in cost. For example a given substance may rapidly accelerate a rubber cure but it may be poisonous or uncomfortable to handle; again, it might be satisfactory in these respects but have such a physical character as to be difficult to incorporate in the rubber mix; further, the accelerator may be subject to prevulcanization, may not give the desired qualities on aging, may not give to the rubber the desired resistance to abrasion and so on.

It is the object of this invention to provide accelerators for the vulcanization of rubber that are nontoxic, convenient to handle and can be readily incorporated into the rubber in the mill room.

This application is a division of application S. N. 7,327 filed Feb. 6. 1925, which was inadvertently made a joint application, and pertains to that part of said joint application not covered by copending application S. N. 37,868, filed June 17, 1925.

This invention relates to the use of the products formed by the interaction of cyanamide with salts of amines as accelerators of the vulcanization of natural rubber, balata, gutta percha, synthetic rubber and rubber substitutes.

It especially relates to the acceleration of vulcanization of rubber at elevated temperatures.

I have discovered that the reaction product obtained by treating an aryl amine as, for example, aniline with cyanamide is particularly effective for this purpose. The reaction of these two substances is accomplished by reacting a salt of the aryl amine as, for example, aniline hydrochloride with the cyanamid and thereafter treating with caustic to obtain the free base which is the accelerator of my invention. The reactions are as follows:

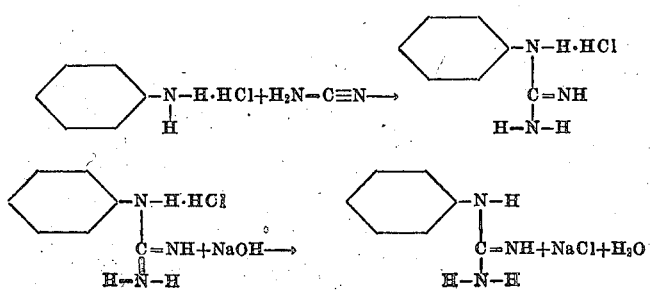

It is thus seen that this accelerator contains the characteristic group.

and is represented by the general formula

wherein R is any organic radical, preferably of the aromatic series.

These compounds may be named as a substituted guanidine, for example, alpha mono aryl guanidine or they might be given an amine name thus clearly designating their origin. Thus the product from aniline and cyanamide which has the formula

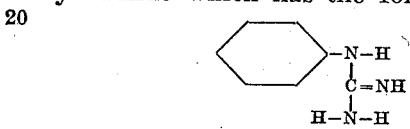

becomes guanyl-phenyl-amine or simply guanyl aniline in which

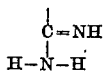

is the guanyl radical.

In producing my accelerator in accordance with the above reactions I proceeded as follows:

298 grams 80% cyanamide ($H_2CN_2$) and 736 grams aniline hydrochloride ($C_6H_5NH_2 \cdot HCl$) were mixed in 2500 cc. absolute alcohol and refluxed for 8 hours. The alcohol was then distilled off and the residue dissolved in water from which the accelerator was precipitated with sodium hydroxide solution. In the use of the terms caustic or caustic alkali throughout the specification and claims I not only mean the sodium hydroxide here mentioned but, as well, any substance having an alkalinity substantially greater than that of the reaction product to be precipitated. Thus potassium hydroxide and other strong bases can be used if the conditions warrant. After recrystallization from benzol a yield of 372.4 grams of alpha mono phenyl guanidine (guanyl aniline) was obtained; this product had a melting point of 65° C.

The method of carrying out my invention with the accelerator thus produced is illustrated by the following examples though I do not desire to be limited by the specific formula and components used:

| | Parts by weight. |
|---|---|
| Smoked sheet | 100 |
| Zinc oxide | 5 |
| Sulphur | 5 |
| Monophenyl guanidine | 0.5 |

These components are mixed together in any suitable way such as milling and then vulcanized or cured in the usual molds or otherwise. When so cured under heat corresponding to a steam pressure of 40 lbs. per square inch for 60 minutes a finished rubber suitable for various uses is obtained having a tensile of over 3150 pounds per square inch when tested by the methods commonly used in the art.

The use of this accelerator is equally applicable to other mixtures such as follows:

| | Parts by weight. |
|---|---|
| Smoked sheet | 50 |
| Buffalo gray tire reclaim | 50 |
| Zinc oxide | 5 |
| Sulphur | 5 |

With no accelerator the above mixture, cured for 40 minutes at a temperature corresponding to 40 pounds steam pressure gave a tensile of 1694 pounds per square inch.

When 0.75% of mono phenyl guanidine was added and the mixture cured for 20 minutes at a temperature corresponding to 40 lbs. steam pressure a tensile of 3011 pounds per square inch was obtained.

I am aware that mono phenyl guanidine has been produced by laboratory methods and the reaction known for many years. E. Erlenmeyer formed this material in 1870 (Berichte III, 896). Adolf Kämpf (Ber. 37, 1681, 1904) prepared an impure product and found it to have a melting point between 50° C. and 60° C. McKee (Am. Chem. Jour. 1901, page 221) reacted aniline hydrochloride with cyanamide in alcohol under pressure and after treatment with caustic obtained a product which he identified as alpha mono phenyl guanidine. He gives the melting point as 66° C.

However down to the time of my researches on this material it was not known that the substance obtained as above was an accelerator of the vulcanization of rubber. Kratz in the Journal of Industrial and Engineering Chemistry XII, 317-324 mentions a material which he calls monophenyl guanidine and which he lists as an accelerator of vulcanization. Since he states that his material had a melting point of 193° C. it is evident that his product was not the mono phenyl guanidine or guanyl aniline to which I refer and which is identified by the work of McKee and others as listed above.

Having thus described my invention and method for using the same I do not wish to be understood as being limited to the exact proportions, ingredients, temperatures, results, etc. indicated.

What I claim is:

1. A process of vulcanizing rubber or similar material which comprises combining with the rubber a vulcanizing agent and an accelerator comprising the product formed by treating with caustic the reaction product of cyanamide and a salt of an amine and vulcanizing the rubber.

2. A process of vulcanizing rubber or similar material which comprises combining with the rubber a vulcanizing agent and an accelerator comprising the product formed by treating with caustic the reaction product of cyanamide with the salt of a primary amine and vulcanizing the rubber.

3. A process of vulcanizing rubber or similar material which comprises combining with the rubber a vulcanizing agent and an accelerator comprising the product formed by treating with caustic the reaction product of cyanamide with the salt of an aryl amine and vulcanizing the rubber.

4. A process of vulcanizing rubber or similar material which comprises combining with the rubber a vulcanizing agent and an accelerator comprising the product formed by treating with caustic the reaction product of cyanamide with the salt of a primary aryl amine and vulcanizing the rubber.

5. A process of vulcanizing rubber consisting in treating it with a vulcanizing agent and the addition product obtained by reacting cyanamide with a salt of an amine and heating the mixture.

6. The process of vulcanizing rubber consisting in treating it with a vulcanizing agent, and the addition product obtained by reacting cyanamide with a salt of an aryl amine and heating the mixture.

7. A process of vulcanizing rubber or similar material which comprises combining with the rubber a vulcanizing agent and an accelerator comprising the product formed by reaction of aniline hydrochloride with cyanamide in a suitable solvent distillation of the solvent, solution of the residue in water and precipitation therefrom with caustic of the desired cyanamid addition product, and vulcanizing the rubber.

8. A process of vulcanizing rubber or similar material which comprises combining with the rubber a vulcanizing agent and mono-phenyl guanidine and vulcanizing the rubber.

9. A vulcanized rubber derived from rubber or similar material combined with a vulcanizing agent and an accelerator comprising the product formed by treating with caustic the reaction product of cyanamide with the salt of an amine.

10. A vulcanized rubber derived from rubber or similar material combined with a vulcanizing agent and an accelerator comprising the product formed by treating with caustic the reaction product of cyanimide with the salt of a primary amine.

11. A vulcanized rubber derived from rubber or similar material combined with a vulcanizing agent and an accelerator comprising the product formed by treating with caustic the reaction product of cyanamide with the salt of an aryl amine.

12. A vulcanized rubber derived from rubber or similar material combined with a vulcanizing agent and an accelerator comprising the product formed by treating with caustic the reaction product of cyanamide with the salt of a primary aryl amine.

13. A vulcanized rubber derived from rubber or similar material combined with a vulcanizing agent and an accelerator comprising the addition product obtained by reacting cyanamide with a salt of an amine.

14. A vulcanized rubber derived from rubber or similar material combined with a vulcanizing agent and an accelerator comprising the addition product obtained by reacting cyanamide with a salt of an aryl amine.

15. A vulcanized rubber derived from rubber or similar material combined with a vulcanizing agent and an accelerator comprising the product formed by reaction of aniline hydrochloride with cyanamide in a suitable solvent distillation of the solvent, solution of the residue in water and precipitation therefrom with caustic of the desired cyanamide addition product.

16. A vulcanized rubber derived from rubber or similar material combined with a vulcanizing agent and mono-phenyl guanidine.

17. A process of vulcanizing rubber or similar material which comprises combining with the rubber a vulcanizing agent and an accelerator characterized by the group $$\begin{array}{c} R-N-H \\ | \\ C-NH \\ | \\ H-N-H \end{array}$$

in which R is a hydrocarbon radical.

18. A process of vulcanizing rubber or similar material which comprises combining with the rubber a vulcanizing agent and an accelerator comprising an alpha mono substituted guanidine in which the substituting group is a hydrocarbon radical, and vulcanizing the rubber.

19. A process of vulcanizing rubber or similar material which comprises combining with the rubber a vulcanizing agent and an accelerator represented by the general formula $$\begin{array}{c} R-N-H \\ | \\ C-NH \\ | \\ H-N-H \end{array}$$

wherein R is an aromatic group, and vulcanizing the rubber.

20. A vulcanized rubber derived from rubber or a similar material with a vulcanizing agent and an accelerator characterized by the group $$\begin{array}{c} R-N-H \\ | \\ C-NH \\ | \\ H-N-H \end{array}$$

in which R is a hydrocarbon radical.

21. A vulcanized rubber derived from rubber or a similar material combined with a vulcanizing agent and an accelerator comprising an alpha mono substituted guanidine in which the substituting group is a hydrocarbon radical.

22. A vulcanized rubber derived from rubber or similar material combined with a vulcanizing agent and an accelerator represented by the general formula $$\begin{array}{c} R-N-H \\ | \\ C-NH \\ | \\ H-N-H \end{array}$$

wherein R is an aromatic group.

Signed at Perth Amboy, in the county of Middlesex and State of New Jersey this First day of June A. D. 1925.

CARL STUART WILLIAMS.